United States Patent
Ouellette et al.

(10) Patent No.: US 6,361,609 B1
(45) Date of Patent: Mar. 26, 2002

(54) ULTRASONIC FULL-WIDTH SHEETER

(75) Inventors: Edward Leon Ouellette, Denton; Samara Renee Perdue, Lancaster, both of TX (US); Barry Forster Wilson, Rolling Hills Estates, CA (US)

(73) Assignee: Recot, Inc., Pleasanton, CA (US)

( * ) Notice: Subject to any disclaimer, the term of this patent is extended or adjusted under 35 U.S.C. 154(b) by 0 days.

(21) Appl. No.: 09/418,495

(22) Filed: Oct. 15, 1999

(51) Int. Cl.⁷ ............... B08B 7/00; A21C 3/02; A21D 2/03
(52) U.S. Cl. ............ 134/1; 134/6; 134/9; 134/42; 425/229; 425/436 R; 426/502.503; 45/93.1; 45/256.51
(58) Field of Search ............... 134/6, 19, 42; 426/502, 503; 425/229, 436 R

(56) References Cited

U.S. PATENT DOCUMENTS

| 3,780,926 A | 12/1973 | Davis |
|---|---|---|
| 3,817,141 A | 6/1974 | Simonetti |
| 4,131,505 A | 12/1978 | Davis, Jr. |
| 4,208,001 A | 6/1980 | Martner |
| 4,599,926 A | 7/1986 | Carlson, Jr. |
| 4,692,109 A | 9/1987 | Hayashi |
| 5,435,714 A | 7/1995 | Van Lengerich |
| 5,580,583 A | 12/1996 | Caridis |
| 5,592,870 A | 1/1997 | Sanchez |
| 5,626,898 A | 5/1997 | Caridis |
| 5,635,235 A | 6/1997 | Sanchez |
| 5,673,609 A | 10/1997 | Sanchez |
| 5,720,990 A | 2/1998 | Lawrence et al. |
| 5,863,566 A | 1/1999 | Wood et al. |
| 6,159,518 A | * 12/2000 | Wison .......... 426/502 |

\* cited by examiner

*Primary Examiner*—Alexander Markoff
(74) *Attorney, Agent, or Firm*—Colin P. Cahoon; Carstens, Yee & Cahoon

(57) ABSTRACT

A sheeter device capable of producing a full-width continuous sheet of masa. A series of ultrasonic horns are placed in close proximity to a sheeter roller, thereby scraping the sheeted dough from the roller. The ultrasonic vibration precludes the buildup of dough on the horns. The invention eliminates the need for sheeter wires and their accompanying plastic bands while increasing the dough throughput of the sheeter.

27 Claims, 4 Drawing Sheets

ULTRASONIC FULL-WIDTH SHEETER

BACKGROUND OF THE INVENTION

1. Technical Field

The present invention relates to an apparatus for sheeting dough products and, in particular, to a series of ultrasonic horns or blades used to strip a sheeter roller. The use of ultrasonic horns eliminates the need for a stripper wire and allows for the production of full-width dough sheets.

2. Description of Related Art

A sheeter is a device commonly used in the food industry for making flattened food products, such as tortilla chips, in a continuous processing operation. Typically, a dough product is compressed between a pair of counter rotating sheeter rollers that are located closely together, thereby providing a pinch point through which the dough is formed into sheets. The dough can then be cut by, for example, a cutting roller to form the shape of the product desired.

Many dough products, particularly those that are corn based ("masa"), have a tendency to stick to the sheeter rollers rather than dropping onto a conveyer for transportation to the next processing step, such as a baking oven. This is because masa is relatively sticky and has very little cohesive strength. The masa will not support its weight as it falls from the sheeter and cannot be pulled off the sheeter. The use of a stationary scraper blade, as is commonly used with flour dough applications, is not practical because the masa tends to build on and stick to the scraper blade. One common approach to this problem is to string a stripper wire across the face of the sheeter roller so that the stripper wire can scrap away the dough product off of the surface of the roller.

An example of a prior art sheeter wire design in this regard is illustrated by FIGS. 1 and 2. FIG. 1 is a perspective view of the output of a dough sheeter device 110. The cut dough product, in this case uncooked tortilla chips 120 made from masa, can be seen on a conveyer 130 after being deposited on the conveyer 130 by a sheeter roller 140. The sheeter roller 140 will typically have a plurality of plastic bands 150 about the circumference of the sheeter roller 140. These bands 150 ride in groves (now shown) in the sheeter roller 140 and hold the sheeter wire 160 close to the surface of the sheeter roller 140. The bands 150 also provide a surface for returning ribbons of unused masa to the sheeter 110.

A sheeter wire 160 is shown strung across the face of the sheeter roller 140. This sheeter wire 160 is attached to two fixed points 170, 180 and is threaded across the face of the sheeter roller 140 underneath each of the bands 150. This provides a flush contact between the sheeter wire 160 and the surface of the sheeter roller 140. The second fixed point 180 could also comprise a tension device such as a hydraulic or pneumatic device that provides a constant tension on the wire 160. Such a tension device is typically connected to a warning device to provide an indication of wire breakage.

FIG. 2 is a schematic side view of a prior art sheeter wire design installed on a sheeter device. Masa 205 is fed between a press roller 207 and the sheeter roller 240. The press roller 207 turns at a slower rotational speed than the sheeter roller 240. This results in the masa 205 adhering to the sheeter roller 240. The masa 205 is next cut by a cutter roller 209. The cut masa is then stripped from the sheeter roller 240, by the sheeter wire 260. The cut product 220 then drops onto a conveyor 230 to be transported for further processing. As will be described below, sheeters using a sheeter wire arrangement such as illustrated in FIGS. 1 and 2 have three primary drawbacks—wire 160 breakage, band 150 breakage, and an inability to produce full-width sheets.

Returning to FIG. 1, the sheeter wire 160 is typically commercial piano wire. A typical tension on the wire during operation is 100 to 125 pounds. Contact with hardened masa, particularly during start-up, can subject the sheeter wire 160 to higher tension for short time periods. During operation the wire 160 is also subject to friction from the moving face of the sheeter roller 140. This wire 160 must be replaced periodically or the wire 160 is prone to breakage after time. In fact, in a continuous use operation for a typical sheeter device producing tortilla chips, it has been observed that such fixed sheeter wire 160 will break, if not replaced, nearly daily.

In order to replace a broken sheeter wire the entire sheeter device 110 and, consequently, the entire chip processing assembly, must be stopped. The broken sheeter wire 160 is removed. A new sheeter wire 160 is attached to the first attaching point 170, strung across the face of the sheeter roller 140 under the bands 150, and attached to a second attaching point 180. Then the tension device 190 must be reactivated. Raw material is lost because the dough that was on the sheeter must be thrown away and additional product downstream may need to be discarded. Start-up procedures must next be followed, which result in further lost product. A wire breakage event, therefore, results in a substantial amount of unscheduled downtime and lost product. The alternative is to schedule, on a daily basis, the replacement of the sheeter wire 160. A scheduled replacement of the sheeter wire 160, however, results in even more frequent, although scheduled, downtime.

One attempt at addressing the wire breakage problem is reflected in U.S. Pat. No. 5,720,990 ("Lawrence") issued on Feb. 24, 1998. The Lawrence patent discloses a wire separator system for a sheeter device comprising a motor that drives a feed spool and a motor that drives a take-up spool. Tension is maintained on the sheeter wire by use of a tension sensing pulley providing input to a controller which modulates the torque on the take-up reel. Provided that the wire does not unexpectedly break, the Lawrence patent discloses a device that will allow the sheeter to run for long periods of time without the necessity of stopping the sheeter to replace the sheeter wire, because new wire is constantly drawn across the contact surface.

The invention disclosed by Lawrence has several drawbacks, however. First, the design assumes that the wire will not break during operation. Unfortunately, this is not a safe assumption. In fact, it is not an infrequent occurrence that wire breakage occurs on the prior art model illustrated by FIG. 1 shortly after a new wire has been installed. This could occur due to a sudden contact with a dried piece of dough that has become affixed to the sheeter while the sheeter is stationary. Further, an initial steady-state friction between the sheeter wire and the sheeter must be overcome at the instant the sheeter begins to rotate. Since the Lawrence device provides that one motor feeds wire while another motor takes-up wire, a breakage between the two motors can result in the continued feeding of wire into the sheeter until the feed motor comes to a stop. A breakage also results in a loss of tension on the feed spool and can lead to unraveling or the "weed eater" effect, whereby the spool becomes unwound. Further, the Lawrence device is designed to maintain constant tension of the wire by using a variable speed pulling motor connected to the take-up reel. Since the Lawrence feed spool is connected to a fixed speed motor, the tension will necessarily fluctuate at the point that the wire is leaving the feed spool when, for example, the wire encounters a piece of dried dough product on the sheeter during operation. These torque fluctuations could effect the consistency of the feed spool's wound tension, thereby leading to further torque fluctuations and potential feed problems.

Minor breakage issues aside, the prior art sheeter device illustrated in FIG. 1 and the Lawrence device have other shortcomings and problems. For example, the bands 150 that hold the sheeter wire 160 in place are also subject to frequent breakage. Band breakage will probably occur with even greater frequency when a continuously drawn sheeter wire 160, such as disclosed in Lawrence, is used. Again, as with a wire 160 breakage event, band 150 breakage results in stopping the entire sheeter device and assembly line, thereby resulting in down time, loss of downstream product, and loss of product due to start-up procedure requirements. These bands can be periodically replaced; however, replacement also requires shutting down the sheeter device.

The use of bands 150 also precludes the possibility of sheeting a fall-width sheet of dough product. This is because masa adheres to the exterior of the bands 150 and is returned in ribbons to the sheeter 110. It may be desirable in certain applications to sheet an uncut, full-width continuous sheet of masa. For example, it may be desirable to cook or partially cook the sheet of dough downstream from the sheeter and then later apply a die cutter to the sheet. Such an arrangement would allow for a higher volume of product to be dispensed from a single sheeter since little to no dough is returned to the sheeter.

Consequently, a need exists for a dough sheeting device capable of sheeting masa and other sticky dough products without the use of stripper wire and the attending bands. Such apparatus should be capable of producing a full-width and continuous sheet of masa without a buildup of masa on the stripping mechanism.

SUMMARY OF THE INVENTION

The proposed invention comprises a sheeter device that utilizes a series of vibrating horns in close proximity to the sheeter roller for stripping the sheeted product off the roller, thereby forming a fall-width continuous sheet of dough. The horns vibrate in the ultrasonic range, thereby precluding masa buildup on the surface of the horns.

Use of the ultrasonic horns as a scraping device eliminates the need for a sheer wire and the attending bands. Consequently, the invention can be operated continuously without concern for replacing worn or broken sheeter wire or bands. Further, since the need for bands is eliminated, the device can produce fall-width, continuous sheets of dough product. These full-width sheets result in a higher volume of dough product being produced by a single sheeter device. This is evident by the fact that dough does not return to the sheeter as ribbons attached to the bands.

The above as well as additional features and advantages of the present invention will become apparent in the following written detailed description.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

DETAILED DESCRIPTION

Figure 3:
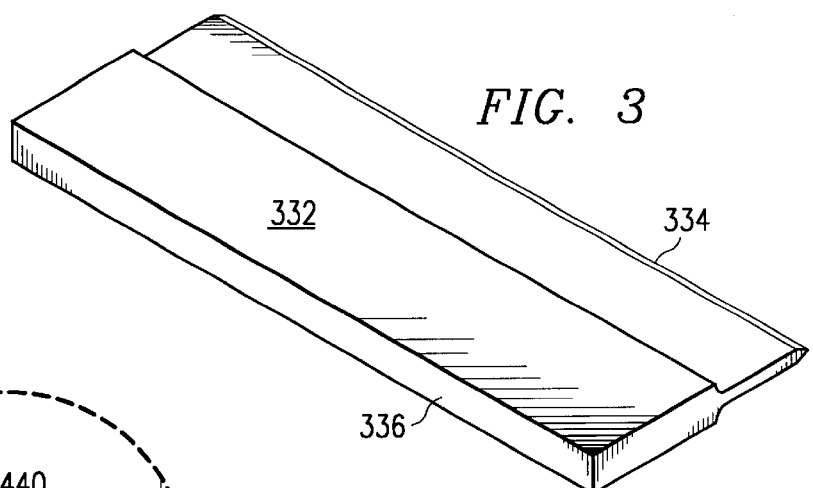
FIG. 3 is a perspective view of a single horn of the invention.

FIG. 3 is a perspective view of a horn or blade of the scraper device of the invention. The horn 332 is typically constructed of a single piece of titanium and is shaped to provide a specific resonant frequency. The horn 332 comprises a pointed edge or tip 334 that, as will be explained in farther detail below, is placed in close proximity to a sheeter roller. The horn 332 is attached at a butt end 336 to a device for producing ultrasonic vibration. A suitable horn 332 is a ten inch, Half Wave Titanium Guillotine Horn manufactured to increased precision dimensional tolerances by Dukane Corporation of St. Charles, Ill.

Figure 4B:
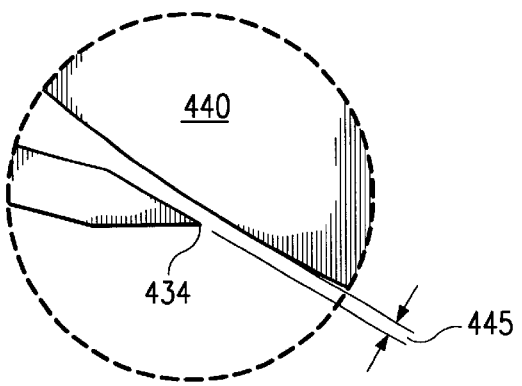
FIGS. 4a and 4b are schematic side view representations of a horn of the invention in operational proximity to a sheeter roller.
Figure 4A:
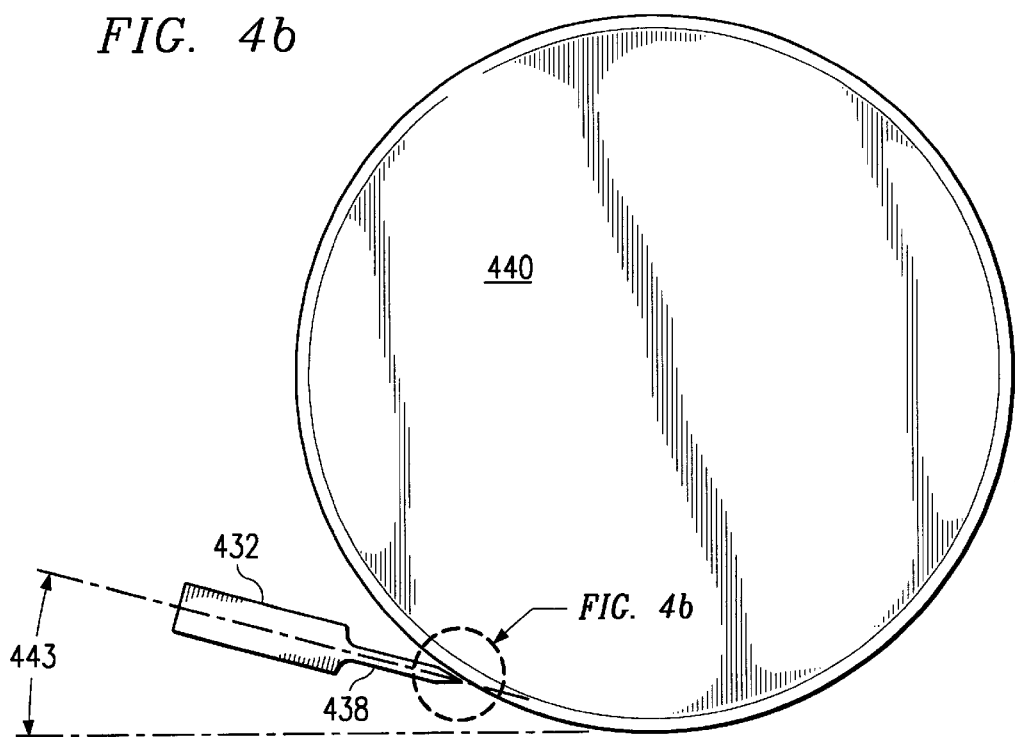

FIGS. 4a and 4b are schematic side views of the horn 442 in a relative position to the sheeter roller 440. FIG. 4b is a magnified view of the portion of FIG. 4a identified by a dashed circle. The long axis of the horn 432 must be placed at an optimal angle 443 to the horizontal plane in order to insure an optimal scraping angle near the surface of the sheeter roller 440. In one embodiment, it has been determined that an angle 443 of approximately 12° to 16° results in the best scraping angle for the apparatus. It should also be noted that the blade tip 434 is placed in close proximity, but not in contact with, the sheeter roller 440. This placement is critical, as allowing the blade tip 434 to contact the sheeter roller 440 dampens the horn vibration. With the horn 432 vibration dampened, masa can quickly build-up on the underside 438 of the horn 432. Conversely, if the blade tip 434 is placed too far away from the sheeter roller 440, the device will not efficiently strip the dough product from the surface of the sheeter roller 440. It has been determined in one embodiment of the invention that an ideal distance 445 (not shown to scale) between the blade tip 434 and the surface of the sheeter roller 440 is approximately 0.004 to 0.011 inches.

Figure 5:
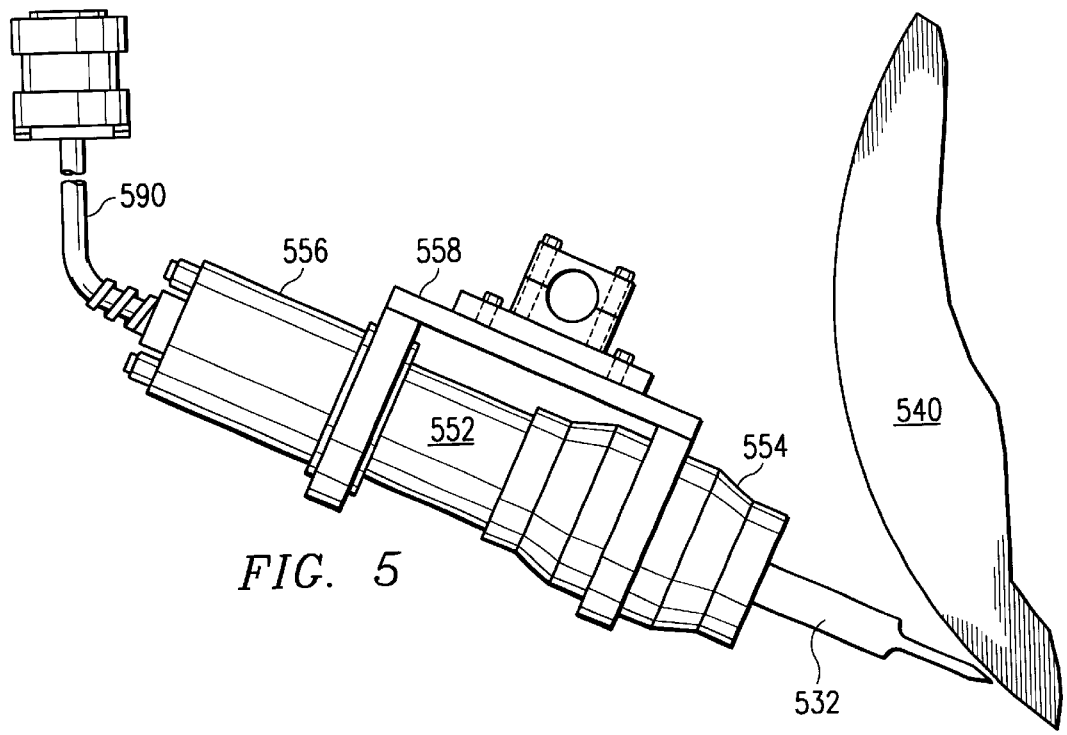
FIG. 5 is a side view of a single scraper device of the invention.

FIG. 5 is a side view of a single scraper device 552 in close proximity to a sheeter roller 540. The sheeter scraper device 552 comprises the horn or blade 532 which is attached to a booster 554. The booster tunes vibrations produced by a probe 556. The probe 556 and booster 554 are in turn connected to a bracket assembly 558. The probe 556 is electrically connected to a power supply by a cord 590. A suitable probe 556 and booster 554 assembly is a 41530 Sealed Probe Stack manufactured by Dukane Corporation of St. Charles, Ill.

Figure 6:
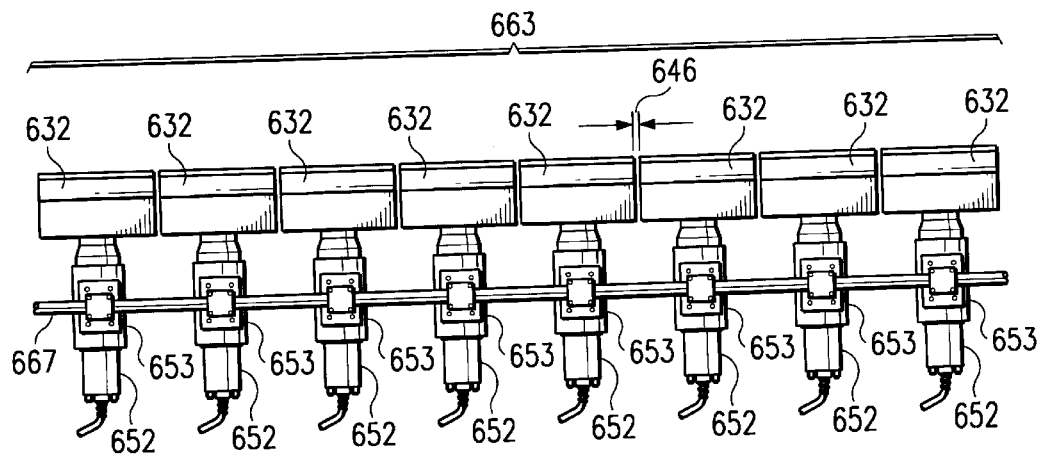
FIG. 6 is an overhead view of the scraper assembly of one embodiment of the invention.

FIG. 6 is an overhead view of several of the single scraper devices 652 mounted in series to a stationery bar 667, thereby forming a scraper assembly 663. The assembly 663 requires a small separation 646 (not shown to scale) between each individual horn 632. The individual horns 632 cannot be allowed to contact each other, as such contact would result in dampening the beneficial vibration of the horns 632. However, the gap 646 between adjacent horns 632 should be as small as possible to accomplish this separation in order to avoid any noticeable effect, such as a seam, on the sheeted dough. An acceptable distance 646 between adjacent horns 632 has been found to be approximately 0.004 to 0.011 inches. This separation issue is eliminated in an alternative embodiment that comprises a single horn that is sufficiently wide to span the sheeting length required. Also, gap 646 tolerances might be less crucial and could be widened if full width sheeting is not required.

Figure 7:
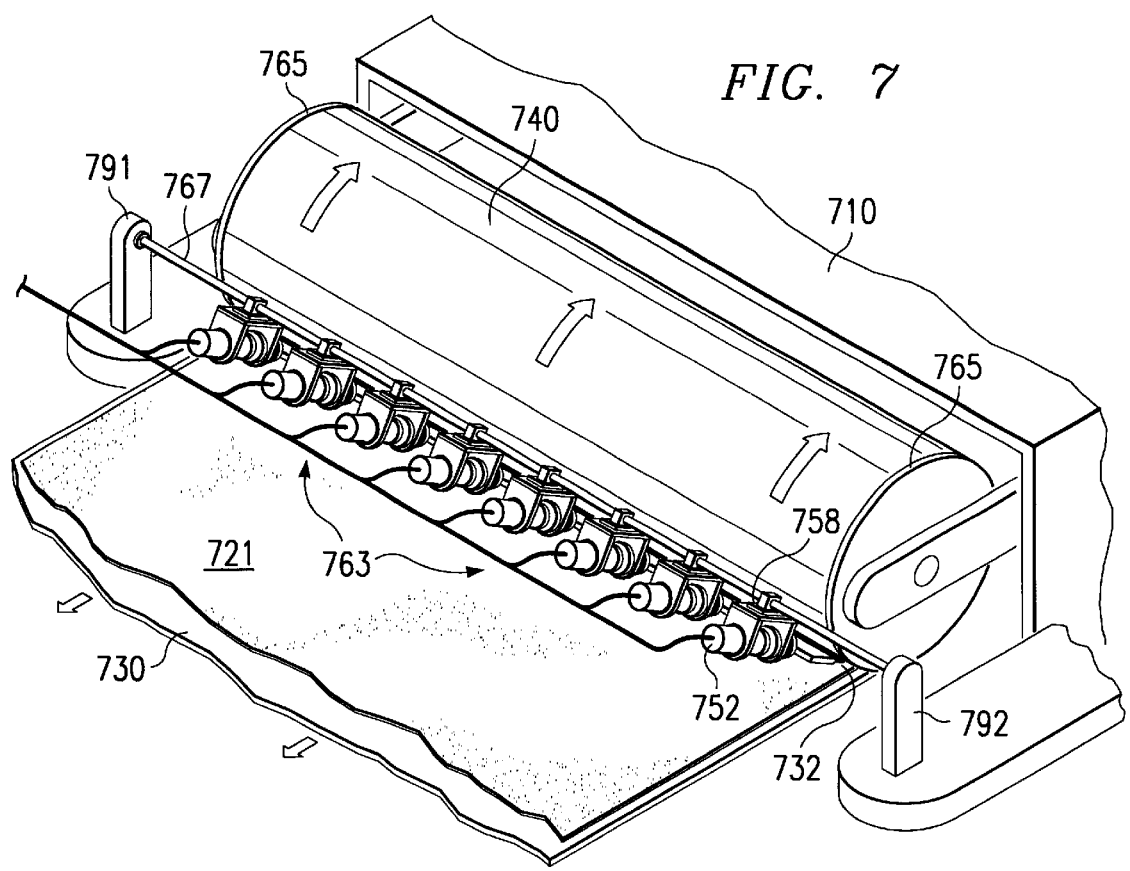
FIG. 7 is a perspective representation of one embodiment of the invention.

FIG. 7 is a perspective view of an embodiment of the invention showing a scraper assembly 763 producing a fall-width, continuous sheet of masa 721. It should be noted that the sheeter 710 does not require bands or a sheeter wire. Consequently, practically all of the dough fed into the sheeter 710 is actually sheeted and placed on the conveyor 730. It is preferable, however, to leave a thin circulating ribbon of masa 765 on either end of the sheeter roller 740 such that the edges of the sheeted masa 721 are clean and uniform. This is accomplished by keeping the aggregate blade content width of the scraper assembly slightly narrower than the width of the sheeter roller 740. Clean and uniform edges on the masa sheet 721 allow for the use of a die cutting device that can take advantage of the linear geometry of the edge of the sheeted masa 721 in cutting shapes out of said sheet 721.

Figure 1:
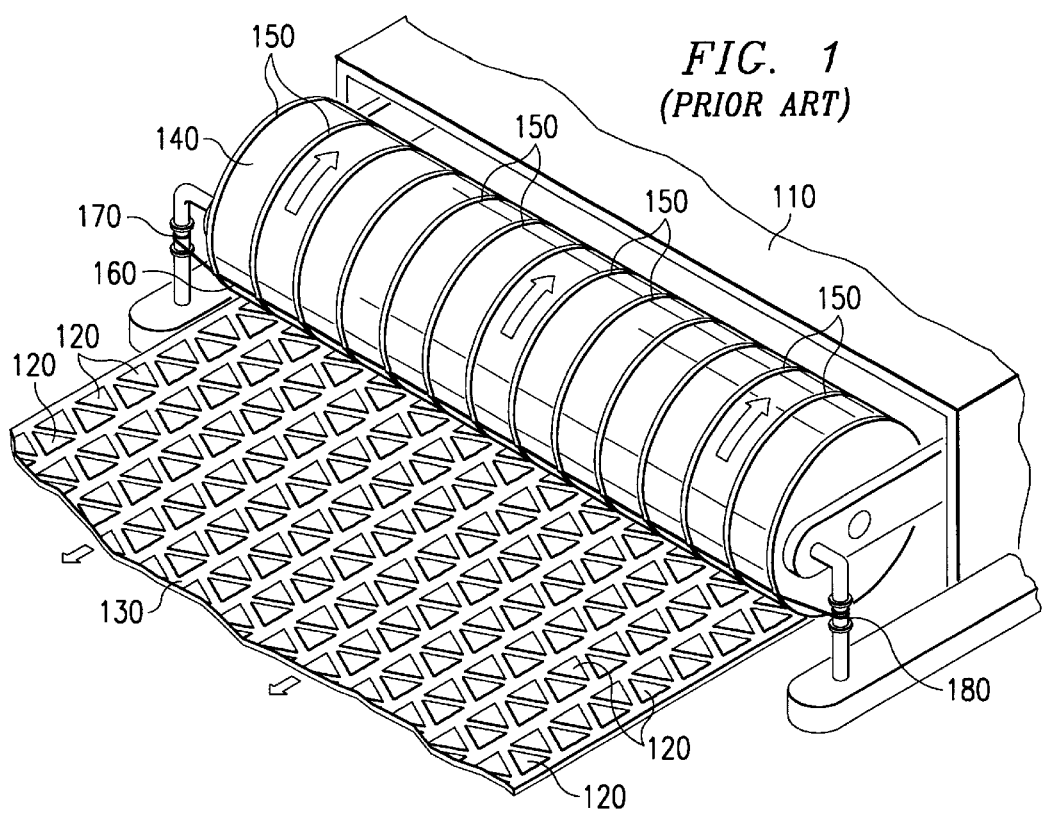
FIG. 1 is a perspective representation of a prior art sheeter device with a fixed sheeter wire.
Figure 2:
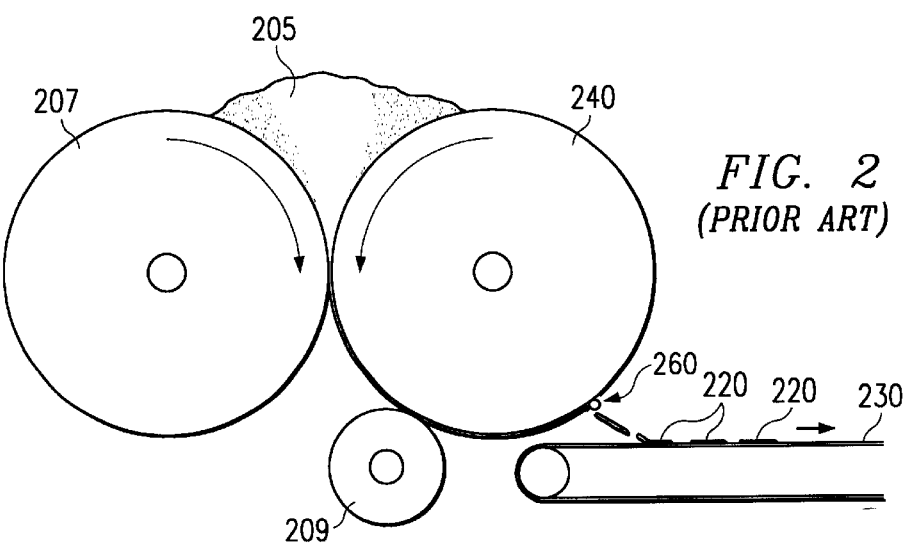
FIG. 2 is a schematic side view representation of a prior art sheeter device with a fixed sheeter wire.

The full-width sheeting capability of the invention can be used to produce a full-width sheet 721 of dough. This may be preferable when it is desired to cook or partially cook the dough in its sheeted form prior to cutting or further processing. Alternatively, the invention can also be utilized to scrape cut dough off of the sheeter roller 740, using a cutter roller such as the one shown in FIG. 2. As previously noted, the scraper assembly 763 comprises a series of scraper devices 752, all attached from their respective brackets 758 to a stationary bar 767. This bar 767 is mounted to two side brackets 791, 792 in order to precisely hold the entire assembly 763 in relative position to the sheeter roller 760 such that the angles 443 illustrated in FIG. 4a and distance 445 illustrated in FIG. 4b can be precisely maintained.

The key to the invention is the use of scrapers or horns that are allowed to constantly vibrate in the ultrasonic or other suitable range. In one embodiment of the invention, the ultrasonic vibration produced was in the frequency range of 10 kHz to 40 kHz and amplitude of 0.001 inches to 0.004 inches. The preferred frequency range for the ultrasonic vibration is from 20 kHz to 40 kHz. One preferred embodiment of the invention operates at 20 kHz. The amplitude of the ultrasonic vibration embodiment is preferably at least 0.001 inches. The preferred embodiment that operates at a frequency of 20 kHz operates at an amplitude of 0.003 inches. With the distances and angles previously described, this frequency and amplitude promotes the clean and uniform stripping of the dough product 721 off of the sheeter roller 740 without any residual buildup of the dough on the horns 732. In one preferred embodiment, the sheeter roller 740 is sandblasted. A sandblasted surface promotes the desired scrapping of the invention.

Since the sheeter device 710 of the invention requires no bands or sheeter wire, the sheeter 710 can be operated continuously. This continuous operation in combination with the fact that little masa is returned to the sheeter results in an individual sheeter device 710 producing a substantially higher amount of sheeted product 721 over a given time period. Further, component wear is minimal, since the horns are never in contact with the sheeter roller 740.

While the invention has been particularly shown and described with reference to a preferred embodiment, it will be understood by those skilled in the art that various changes in form and detail may be made therein without departing from the spirit and scope of the invention.

What is claimed is:

1. A sheeter device having a sheeter roller comprising:
   at least one vibrating horn having a tip, said tip located in non-contact proximity to said sheeter roller such that said tip does not contact said sheeter roller during operation of the sheeter device, whereby said tip when vibrated by said horn scrapes sheeted dough from said sheeter roller.

2. The sheeter device of claim 1 wherein the horn vibrates in the frequency range of 10 kHz to 40 kHz and amplitude range of 0.001 inches to 0.004 inches.

3. The sheeter device of claim 1 wherein the horn vibrates at a frequency of approximately 20 kHz.

4. The sheeter device of claim 1 wherein the horn vibrates in the frequency range of 20 kHz to 40 kHz.

5. The sheeter device of claim 1 wherein the horn vibrates at an amplitude of at least 0.001 inches.

6. The sheeter device of claim 1 wherein the horn vibrates at an amplitude of approximately 0.003 inches.

7. The sheeter device of claim 1 wherein the vibrating horn continuously scrapes masa dough from the sheeter roller without build-up of masa on the horn.

8. The sheeter device of claim 1 wherein at least two vibrating horns are placed in series.

9. The sheeter device of claim 8 wherein vibrating horns are spaced approximately 0.004 inches to 0.011 inches apart.

10. The sheeter device of claim 8 wherein the vibrating horns placed in series produce a full-width sheet of dough.

11. The sheeter device of claim 1 wherein said horn tip is placed approximately 0.004 to 0.011 inches from the sheeter roller.

12. The sheeter device of claim 1 wherein the sheeter roller comprises a sandblasted surface.

13. A scraper for a dough sheeter having a sheeter roller, said scraper comprising:
   a horn having a tip, wherein said tip is located in non-contact proximity to the sheeter roller; and
   a vibrating device in contact with said horn;
   wherein, when said horn is vibrated by said vibrating device, said horn scrapes dough from the sheeter without coming into physical contact with said sheeter.

14. The scraper of claim 13 further comprising:
   a bracket attached to said horn.

15. The scraper of claim 14 wherein two or more horns are placed in series by attaching each horn's bracket to a bar.

16. The scraper of claim 15 wherein each horn tip is separated approximately 0.004 inches to 0.011 inches apart.

17. The scraper of claim 15 wherein said two or more horns scrape a full-width sheet of dough without residual build-up of dough on said horns.

18. The scraper of claim 13 wherein the vibrating device oscillates said horn in a frequency range of 10 kHz to 40 kHz and an amplitude range of 0.001 inches to 0.004 inches.

19. The scraper of claim 13 wherein the vibrating device oscillates at a frequency of approximately 20 kHz.

20. The scraper of claim 13 wherein the vibrating device oscillates at an amplitude of at least 0.001 inches.

21. The scraper of claim 13 wherein the vibrating device oscillates at an amplitude of approximately 0.003 inches.

22. A method for scraping dough from a sheeter roller, said method comprising the steps of:

a) placing the tip of at least one scraping horn in non-contact proximity to a sheeter roller; and b) vibrating said scraping horn at an amplitude and distance from the sheeter roller such that said tip of at least one scraping horn does not physically contact the sheeter roller while said tip is vibrating.

23. The method of claim 22 wherein the vibrating of step (b) is in the frequency range of 10 kHz to 40 kHz and amplitude of 0.001 inches to 0.004 inches.

24. The method of claim 22 wherein the frequency of the vibrating step (b) is approximately 20 kHz.

25. The method of claim 22 wherein the amplitude of the vibrating step (b) is at least 0.001 inches.

26. The method of claim 22 wherein the amplitude of the vibrating step (b) is approximately 0.003 inches.

27. The method of claim 22 wherein the dough comprises masa.

* * * * *